United States Patent
Xu et al.

(10) Patent No.: US 10,339,389 B2
(45) Date of Patent: Jul. 2, 2019

(54) METHODS AND SYSTEMS FOR VISION-BASED MOTION ESTIMATION

(71) Applicant: Sharp Laboratories of America, Inc., Camas, WA (US)

(72) Inventors: Xinyu Xu, Duluth, GA (US); Miao Liao, Camas, WA (US); Petrus J. L. van Beek, Camas, WA (US)

(73) Assignee: Sharp Laboratories of America, Inc., Vancouver, WA (US)

( * ) Notice: Subject to any disclaimer, the term of this patent is extended or adjusted under 35 U.S.C. 154(b) by 230 days.

(21) Appl. No.: 14/476,524

(22) Filed: Sep. 3, 2014

(65) Prior Publication Data

US 2016/0063330 A1 Mar. 3, 2016

(51) Int. Cl.
*G05D 1/02* (2006.01)
*G06K 9/00* (2006.01)
*B60R 1/00* (2006.01)
*G06K 9/46* (2006.01)
(Continued)

(52) U.S. Cl.
CPC ............ *G06K 9/00791* (2013.01); *B60R 1/00* (2013.01); *G05D 1/0253* (2013.01); *G06K 9/4671* (2013.01); *G06T 7/246* (2017.01); *G06T 7/73* (2017.01); *G06T 2207/10016* (2013.01);
(Continued)

(58) Field of Classification Search
CPC .. G05D 1/0246; G05D 1/0251; G05D 1/0253; G05D 1/0212; G05D 1/0272; G05D 1/0231; Y10S 901/01; G06T 2207/10016; G06T 2207/30252; G06T 17/00; G06T 13/40; G06T 2207/10028; G06T 7/33; G06T 7/246; G06T 7/20; G06T 17/05; G06T 19/003; G06T 2207/30244; G06T 15/20; G06T 7/579; G06T 7/73; G06T 7/70; G06T 7/74; G06T 2207/30256; G01C 21/165; G01C 21/16; G01C 21/206; G06K 9/00624; G06K 9/00805; G06K 9/00798;
(Continued)

(56) References Cited

U.S. PATENT DOCUMENTS

| | | | | |
|---|---|---|---|---|
| 8,031,906 | B2 * | 10/2011 | Fujimura | ........... G06K 9/00201 |
| | | | | 348/169 |
| 8,213,706 | B2 * | 7/2012 | Krishnaswamy | .... G05D 1/0253 |
| | | | | 382/103 |

(Continued)

FOREIGN PATENT DOCUMENTS

| | | |
|---|---|---|
| JP | 2009266224 A | 11/2009 |
| JP | 2014503376 A | 2/2014 |
| WO | 2013185102 A1 | 12/2013 |

OTHER PUBLICATIONS

Silva et al., Combining sparse and dense methods in 6D Visual Odometrry, Apr. 24, 2013 [retrieved Jun. 20, 2016], 2013 13th International Conference on Autonomous Robot Systems (Robotica), six pages total. Retrieved from the Internet: http://ieeexplore.ieee.org/xpls/abs_all.jsp?arnumber=6623527.*

(Continued)

*Primary Examiner* — Andrew M Moyer
*Assistant Examiner* — Dennis Rosario
(74) *Attorney, Agent, or Firm* — Law Office of Gerald Maliszewski; Gerald Maliszewski (57) ABSTRACT

Aspects of the present invention are related to methods and systems for vision-based computation of ego-motion.

16 Claims, 3 Drawing Sheets

(51) Int. Cl.
*G06T 7/73* (2017.01)
*G06T 7/246* (2017.01)

(52) U.S. Cl.
CPC ............... *G06T 2207/20021* (2013.01); *G06T 2207/30244* (2013.01); *G06T 2207/30252* (2013.01)

(58) Field of Classification Search
CPC ............ G06K 9/00791; G06K 9/00369; B60R 11/04; A61B 34/20; A61B 34/30
See application file for complete search history.

(56) References Cited

U.S. PATENT DOCUMENTS

| | | | | |
|---|---|---|---|---|
| 8,798,357 | B2* | 8/2014 | Sinha | G06K 9/00664 345/419 |
| 8,831,290 | B2* | 9/2014 | Ramalingam | G06T 7/73 382/107 |
| 8,855,848 | B2* | 10/2014 | Zeng | B60W 40/105 701/28 |
| 8,866,901 | B2* | 10/2014 | Azuma | G06T 7/246 348/135 |
| 8,885,049 | B2* | 11/2014 | Miksch | H04N 17/002 348/118 |
| 9,079,311 | B2* | 7/2015 | Wang | B25J 9/1689 |
| 9,158,977 | B2* | 10/2015 | Sibiryakov | G06T 3/4038 |
| 9,223,312 | B2* | 12/2015 | Goel | G05D 1/0268 |
| 9,286,810 | B2* | 3/2016 | Eade | G09B 29/007 |
| 9,304,194 | B2* | 4/2016 | Rhee | G01S 3/7864 |
| 9,946,264 | B2* | 4/2018 | Liao | G05D 1/0253 |
| 9,969,337 | B2* | 5/2018 | Liao | G06T 7/73 |
| 2014/0333741 | A1* | 11/2014 | Roumeliotis | G01S 5/16 348/61 |

OTHER PUBLICATIONS

Zhang et al., Calibration Between Depth and Color Sensors for Commodity Depth Cameras, Jul. 11-15, 2011 [retrieved Mar. 26, 2018], 2011 IEEE International Conference on Multimedia and Expo, 6 total pages. Retrieved from the Internet: http://ieeexplore.ieee.org/abstract/document/6012191/.*

Ke et al., Transforming Camera Geometry to a Virtual Downward-Looking Camera: Robust Ego-Motion Estimation and Ground-Layer Detection, Jun. 18-20, 2003 [retrieved Mar. 26, 2018], 2003 IEEE Computer Society Conference on Computer Vision and Pattern Recognition, 8 total pages. Retrieved Internet: http://ieeexplore.ieee.org/abstract/document/1211380/.*

Scaramuzza et al., Appearance-Guided Monocular Omnidirectional Visual Odometry for Outdoor Ground Vehicles, Sep. 16, 2008 (1st public dissemi) [retri Dec. 9, 2018], IEEE Trans Robotics, vol. 24, Iss: 5, pp. 1015-1026. Internet: https://ieeexplore.ieee.org/abstract/document/4625958/media#media (Year: 2008).*

Goecke et al., Visual Vehicle Egomotion Estimation using the Fourier-Mellin Transform, Jun. 13-15, 2007 (1st public dissemination)[ retrieved Dec. 9, 2018], 2007 IEEE Intelligent Vehicles Symposium, pp. 450-455. Retrieved from the Internet: https://ieeexplore.ieee.org/abstract/document/4290156 (Year: 2007).*

Campbell et al., A Robust Visual Odometry and Precipice Detection System Using Consumer-grade Monocular Vision, Apr. 18-22, 2005 (1st diss) [retri Dec. 9, 2018], 2005 IEEE International Conference on Robotics and Automation, pp. 3421-3427. https://ieeexplore.ieee.org/abstract/document/1570639 (Year: 2005).*

Renno et al., Learning Surveillance Tracking Models for the Self-Calibrated Ground Plane, Sep. 2-5, 2002 [retrieved Dec. 9, 2018], 13th British Machine Vision Conference, pp. 607-616. Retrieved Internet: https://eprints.kingston.ac.uk/7569/ & http://www.bmva.org/bmvc/2002/papers/185/full_185.pdf (Year: 2002).*

Silva, H. et al., "Combining sparse and dense methods in 6D visual odometry," In Proceedings of the 13th International Conference on Autonomous Robot Systems (Robotics), Apr. 24, 2013, Lisbon, Portugal, 6 pages.

* cited by examiner

METHODS AND SYSTEMS FOR VISION-BASED MOTION ESTIMATION

FIELD OF THE INVENTION

Embodiments of the present invention relate generally to methods and systems for motion estimation and, in particular, to methods and systems for vision-based computation of ego-motion.

BACKGROUND

Accurate estimation of the ego-motion of a vehicle relative to a surface path on which the vehicle is traveling may be a key component for autonomous driving and computer-vision-based driving assistance. The use of one or more cameras, as opposed to other sensors, for computing ego-motion may allow for the integration of ego-motion data into other vision-based algorithms, for example, obstacle detection and/or avoidance, pedestrian detection and/or avoidance, object detection and/or avoidance and other vision-based algorithms, without necessitating calibration between sensors. This may reduce maintenance requirements and cost. The process of estimating the ego-motion of an agent, for example, a vehicle, a human, a robot and other mobile agents, using only input from one or more cameras attached to the agent is referred to as Visual Odometry (VO).

In VO, the pose of a mobile agent is incrementally estimated via examination of changes that the motion of the mobile agent induces on the images obtained by the one or more onboard cameras. For VO to work effectively, sufficient illumination in the environment and a static scene with sufficient texture to allow apparent motion to be extracted may be required. Additionally, temporally consecutive frames should be captured to ensure sufficient scene overlap.

One advantage to VO for providing a motion estimate is that VO is not affected by wheel slip in uneven terrain and other adverse conditions. Furthermore, VO may provide important supplemental information to other motion-estimation processes and systems, for example, Global Positioning System (GPS), Inertial Measurement Units (IMUs), laser odometry and other systems providing motion estimation. Additionally, in GPS-denied environments, for example, underwater, aerial and other environments wherein GPS may be denied, and environments wherein GPS information is not reliable, for example, due to multipath, poor satellite coverage and other reliability factors, VO may have increased importance.

Many motion-estimation algorithms for estimating motion using exclusively video input assume static scenes. Additionally, many motion-estimation algorithms for estimating motion using exclusively video input cannot cope with dynamic and/or cluttered environments or large occlusions generated by passing vehicles. Furthermore, feature matching and outlier removal in motion estimation may not be robust and may subsequently fail. Many motion-estimation schemes require a significant number of key points and may fail when a limited number of key points are available in scenes absent of structure.

Real-time VO methods and systems that do not rely on the above-listed assumptions and overcome the above-listed limitations may be desirable.

SUMMARY

Some embodiments of the present invention comprise methods and systems for using a camera for estimating ego-motion.

According to a first aspect of the present invention, a precisely calibrated camera may be rigidly mounted, on a mobile agent, with respect to the mobile agent and a ground plane. The parameterization of the motion of the mobile agent at any time instant may be simplified from six degrees of freedom to three degrees of freedom by assuming the mobile agent travels over a predominantly planar ground plane, thereby maintaining a fixed camera-to-ground relationship at each time instant during mobile-agent travel.

According to a second aspect of the present invention, an incoming image may be received from the camera. According to a third aspect of the present invention, feature detection may be performed on the received, incoming image. According to a fourth aspect of the present invention, a feature descriptor for each of the detected features may be computed. According to a fifth aspect of the present invention, feature matching between the computed feature descriptors for the received, incoming image and feature descriptors computed for a previously received image may be performed. According to a sixth aspect of the present invention, key points associated with the feature correspondences may be projected from image coordinates to world coordinates. According to a seventh aspect of the present invention, a motion estimate may be computed from the pairs of world coordinates associated with the feature correspondences. According to an eighth aspect of the present invention, when a key pose is detected, a current camera pose in a global coordinate frame may be generated. According to a ninth aspect of the present invention, a motion trajectory may be determined from the current camera pose. According to a tenth aspect of the present invention, the feature descriptors computed for a previously received image may be updated to the feature descriptors computed for the received, incoming image.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 1 is a chart showing exemplary embodiments of the present invention comprising performing feature detection on a received, incoming image, computing a feature descriptor for each of the detected features, performing feature matching between the computed feature descriptors for the received, incoming image and feature descriptors computed for a previously received image, projecting the key points associated with the feature correspondences from image coordinates to world coordinates, computing a motion estimate from the pairs of world coordinates associated with the feature correspondences, when a key pose is detected, generating a current camera pose in a global coordinate frame, determining a motion trajectory from the current camera pose and updating the feature descriptors computed for a previously received image to the feature descriptors computed for the received, incoming image;

DETAILED DESCRIPTION OF THE EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention, but it is merely representative of the presently preferred embodiments of the invention.

Elements of embodiments of the present invention may be embodied in hardware, firmware and/or a non-transitory computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

Accurate estimation of the ego-motion of a vehicle relative to a surface path on which the vehicle is traveling may be a key component for autonomous driving and computer-vision-based driving assistance. The use of one or more cameras, as opposed to other sensors, for computing ego-motion may allow for the integration of ego-motion data into other vision-based algorithms, for example, obstacle detection and/or avoidance, pedestrian detection and/or avoidance, object detection and/or avoidance and other vision-based algorithms, without necessitating calibration between sensors. This may reduce maintenance requirements and cost. The process of estimating the ego-motion of an agent, for example, a vehicle, a human, a robot and other mobile agents, using only input from one or more cameras attached to the agent is referred to as Visual Odometry (VO).

In VO, the pose of a mobile agent is incrementally estimated via examination of changes that the motion of the mobile agent induces on the images obtained by the one or more onboard cameras. For VO to work effectively, sufficient illumination in the environment and a static scene with sufficient texture to allow apparent motion to be extracted may be required. Additionally, temporally consecutive frames should be captured to ensure sufficient scene overlap.

One advantage to VO for providing a motion estimate is that VO is not affected by wheel slip in uneven terrain and other adverse conditions. Furthermore, VO may provide important supplemental information to other motion-estimation processes and systems, for example, Global Positioning System (GPS), Inertial Measurement Units (IMUs), laser odometry and other systems providing motion estimation. Additionally, in GPS-denied environments, for example, underwater, aerial and other environments wherein GPS may be denied, and environments wherein GPS information is not reliable, for example, due to multipath, poor satellite coverage and other reliability factors, VO may have increased importance.

Many motion-estimation algorithms for estimating motion using exclusively video input assume static scenes. Additionally, many motion-estimation algorithms for estimating motion using exclusively video input cannot cope with dynamic and/or cluttered environments or large occlusions generated by passing vehicles. Furthermore, feature matching and outlier removal in motion estimation may not be robust and may subsequently fail. Many motion-estimation schemes require a significant number of key points and may fail when a limited number of key points are available in scenes absent of structure.

Real-time VO methods and systems that do not rely on the above-listed assumptions and overcome the above-listed limitations may be desirable.

Figure 1:
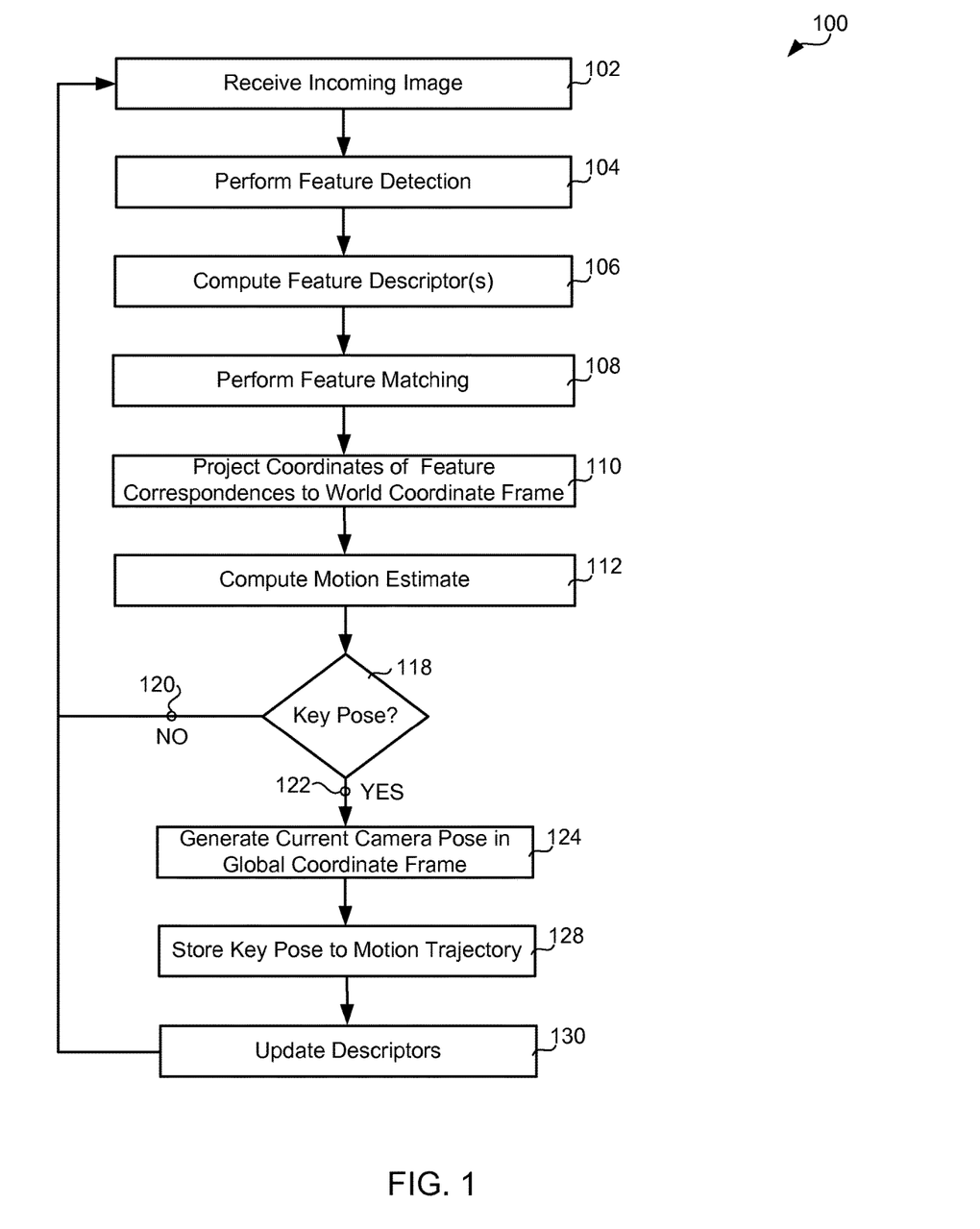

Some embodiments of the present invention described in relation to FIG. 1 may comprise a method 100 for Visual Odometry. An incoming image, also referred to as an incoming image frame and an incoming frame, may be received 102 in a processor component. In some embodiments of the present invention, the incoming image may be received directly from an image-acquisition component. In alternative embodiments, the incoming image may be received indirectly from an image-acquisition component. In some embodiments of the present invention, the image-acquisition component and the processor component may both reside in a camera rigidly attached to a mobile agent. In alternative embodiments of the present invention, the image-acquisition component may reside within a camera rigidly attached to a mobile agent, whereas, the processor component may be onboard the mobile agent, but not integrated with the rigidly attached camera. In some embodiments of the present invention, the incoming image may be a color image. In alternative embodiments of the present invention, the incoming image may be a gray-scale image. In some embodiments of the present invention, the incoming image may be a gray-scale image generated from an acquired color image. In some of these embodiments, the incoming gray-scale image may be generated within an image-acquisition component. In alternative of these embodiments, the incoming gray-scale image may be generated, from an acquired color image, outside of an image-acquisition component.

Feature detection may be performed 104, on the received, incoming image, to identify one, or more, regions, in the received, incoming image, that exhibit a significantly strong variation of intensity, for example, an edge, a corner, a blob, a peak and other spatial feature exhibiting a significantly strong variation in intensity. The center, or substantially the center, of each of the one, or more, identified regions may be designated as a key point, thereby producing one, or more, key points associated with the received, incoming image. Performing feature detection may comprise applying one or more key-point feature detectors known in the art, for example, a corner detector, a blob detector, a peak detector, a Scale-Invariant Feature Transform (SIFT) key-point detector, a Speeded Up Robust Features (SURF) key-point detector, a Features from Accelerated Segment Test (FAST) key-point detector, an Oriented FAST and Rotated BRIEF (ORB) key-point detector, a Maximally Stable Extremal Regions (MSER) key-point detector, a Binary Robust Independent Elementary Features (BRIEF) key-point detector, a Binary Robust Invariant Scalable Keypoints (BRISK) key-point detector, a Fast REtinA Keypoint (FREAK) key-point detector, a STAR key-point detector and other key-point feature detectors, to the received, incoming image. In some embodiments of the present invention, a FAST key-point detector may be used due to its fast detection speed that makes it suitable for real-time autonomous navigation applications.

In some embodiments of the present invention, a grid-based FAST feature detector may be used to perform feature detection 104. In these embodiments, the received, incoming image may be divided into an m×n grid. In some embodiments of the present invention, m and n may be distinct values. In alternative embodiments, the value of m and the value of n may be the same. The FAST key-point detector may be applied to each grid element. In some embodiments of the present invention, a max-key-point-count threshold on the maximum count of key points detected in an image may be specified. The value of the max-key-point-count threshold may be used to adjust the processing speed for each incoming image frame. In some embodiments of the present invention, the number of grid elements may be selected based on a desired processing speed for an incoming image.

A feature descriptor to characterize the region around each designated key point may be computed 106. In some embodiments of the present invention, the feature descriptor associated with a region may be the appearance, for example, the pixel intensity or color values, of the region. In some embodiments of the present invention, the feature descriptor associated with a region may be based on the appearance of the region, for example, the raw pixel values may be normalized by the mean of the pixel values, the energy of the pixel values or some other statistic computed from the raw pixel values. In alternative embodiments, the raw pixel values may be adjusted by the mean of the pixel values, for example, the mean pixel value may be subtracted from the raw pixel values. In some embodiments of the present invention, the feature descriptor may be the spatial gradient across the region. In some embodiments of the present invention, the feature descriptor associated with a region may be robust to one or more of a viewpoint change, a rotation and a scale change. Exemplary descriptors include a SIFT feature descriptor, a SURF feature descriptor, an ORB feature descriptor, a BRIEF feature descriptor, a BRISK feature descriptor, a FREAK feature descriptor and other viewpoint-invariant, rotation-invariant or scale-invariant feature descriptors. In some embodiments of the present invention, the feature descriptor may be a compact feature descriptor. The above-listed feature descriptors are intended for purpose of illustration and not limitation.

Feature matching between the feature descriptors computed from the received, incoming frame and those computed from a previous frame may be performed 108. Each key point in the received, incoming frame may be associated with a key point from a previous frame, thereby producing a plurality of feature correspondences, wherein each feature correspondence associates a key point in the received, incoming frame with a key point in the previous frame.

In some embodiments of the present invention, each feature descriptor computed for the received, incoming frame may be exhaustively compared to each feature descriptor computed for the previous frame. Comparison of an incoming-frame feature descriptor with a previous-frame feature descriptor may comprise computing a similarity measure. In some embodiments of the present invention wherein the feature descriptor is the feature appearance, the similarity measure may be the sum of squared differences. In alternative embodiments of the present invention wherein the feature descriptor is the feature appearance, the similarity measure may be the normalized cross correlation.

In some embodiments of the present invention, performing feature matching 108 may comprise a fast, nearest-neighbor search with a k-dimensional tree. In some embodiments of the present invention, wherein the feature descriptor is a binary descriptor such as the BRIEF descriptor, similarity may be measured using the Hamming distance. In alternative embodiments, wherein other non-binary feature descriptors may be used, a mathematical norm, for example, the L2 norm, the L1 norm and other metrics defined by a norm, may be used for the similarity measure.

In some embodiments of the present invention, the feature matches may be pruned to retain only sufficiently good matches for computing a motion transformation. In some embodiments of the present invention, a distance-ratio test between the top two matches may be performed. The ratio between the closest and the second closest match may be computed. If the ratio is smaller than a user-specified threshold, then the closest match may be accepted. In some embodiments of the present invention, the user-specified threshold may be equal to 0.65. After performing matching with the distance-ratio test, a mutual-consistency check may be performed to eliminate features in the received, input image that match more than one feature in the previous image. The mutual-consistency check eliminates all matches that are not mutually preferred.

The coordinates of the key points associated with each feature-correspondence pair may be projected 110 from an image coordinate frame to a world coordinate frame, also referred to as the mobile-agent coordinate frame.

Figure 2:
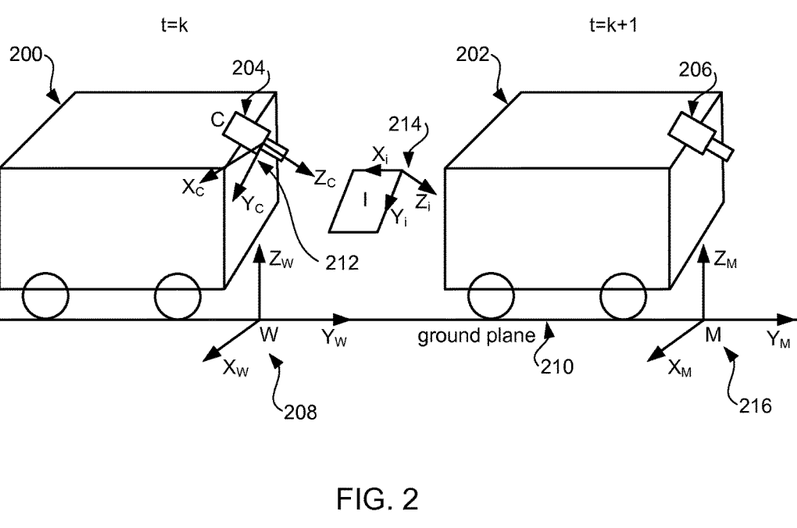
FIG. 2 is a picture illustrating a plurality of coordinate frames related to embodiments of the present invention.

FIG. 2 illustrates a plurality of coordinate frames related to embodiments of the present invention. FIG. 2 depicts a mobile agent 200, 202, with a single, onboard, rigidly mounted camera 204, 206, at two time instants, t=k and t=k+1, respectively. A global world coordinate frame 208, with coordinate axes denoted $X_W$, $Y_W$ and $Z_W$, may be denoted W. The global world coordinate frame 208, W, is stationary when the mobile agent 200, 202 is traveling along a planar ground plane 210 path. The planar ground plane 210 may be assumed to lie in the Z=0 plane. The origin of the global world coordinate frame 208, W, is a starting position of the path. The camera coordinate frame 212 may be denoted C, with coordinate axes denoted $X_C$, $Y_C$ and $Z_C$, the image coordinate frame 214 may be denoted I, with coordinate axes denoted $X_I$, $Y_I$ and $Z_I$, and the mobile-agent coordinate frame 216 may be denoted M, with coordinate axes denoted $X_M$, $Y_M$ and $Z_M$. The mobile-agent coordinate frame 216 may also be referred to as the world coordinate frame. Both the camera coordinate frame 212, C, and the mobile-agent coordinate frame 216, M, may move with the movement of the mobile agent 200, 202.

Since the camera 204, 206 is rigidly mounted on the mobile agent 200, 202, the camera coordinate frame 212, C, has a fixed relationship with the mobile-agent coordinate frame 216, M. A coordinate vector $XX_M$, in the mobile-agent coordinate frame 216, M, corresponding to a point, which may be denoted P, may be related to the coordinate vector, $XX_C$, of the point, P, in the camera coordinate frame 212, C, according to:

$$XX_C = R_C * XX_M + t_C,$$

where $R_C$ may denote a rotation matrix from the mobile-agent coordinate frame 216, M, to the camera coordinate frame 212, C, and $t_C$ may denote a translation vector that is the coordinate vector of the origin of the mobile-agent coordinate frame 216, M, in the camera coordinate frame 212, C. $R_C$ and $t_C$ are extrinsic camera parameters and may be obtained with camera calibration. The point P may be projected on to the image plane by the camera. Denoting the projected image point as p with image coordinate frame coordinate vector $XX_I$, the camera coordinate vector $XX_C$ may be related to $XX_I$ according to:

$$l * XX_I = K * XX_C,$$

where K may denote the camera intrinsic matrix and l may denote a scale factor representing a loss of depth due to projection from three-dimensions to two-dimensions.

The intrinsic and extrinsic camera parameters may be estimated by techniques well-known in the art.

In some embodiments of the present invention, the intrinsic parameters may be obtained and stored permanently in the mobile agent. In some embodiments of the present invention, re-calibration of the extrinsic camera parameters may be performed while the mobile agent is in operation. A calibration pattern on the ground may be captured. The corner points from the image of the calibration pattern may be extracted, and the extrinsic camera parameters may be computed. These newly computed extrinsic camera parameters and the stored intrinsic camera parameters may be used to update the camera parameters when re-calibration is required.

For a key point on the image at image coordinates denoted $[x, y]^T$, a corresponding point in the mobile-agent coordinate frame, also referred to as the world coordinate frame, may be computed according to:

$$l \begin{bmatrix} x \\ y \\ 1 \end{bmatrix} = K [ R_C \; t_C ] \begin{bmatrix} X \\ Y \\ Z \\ 1 \end{bmatrix},$$

where K may denote the camera intrinsic parameters, $R_C$ and $t_C$ may denote the camera extrinsic parameters, $[X, Y, Z]^T$ may denote the coordinates in the mobile-agent coordinate frame and l may denote an unknown scale factor of the coordinate in the mobile-agent coordinate frame. Therefore, the mobile-agent coordinates may be computed according to:

$$\begin{bmatrix} X \\ Y \\ Z \end{bmatrix} = R_C^{-1} \left( l K^{-1} \begin{bmatrix} x \\ y \\ 1 \end{bmatrix} - t_C \right).$$

Assuming that the mobile agent travels predominantly on a ground plane and that the camera only looks at the ground plane, the coordinate of the key point in the world coordinate frame must satisfy the ground plane equation. The general form of any plane may be expressed as:

$$aX + bY + cZ + d = 0$$

and may be written:

$$[a \; b \; c] \begin{bmatrix} X \\ Y \\ Z \end{bmatrix} + d = 0.$$

Hence:

$$[a \; b \; c] R_C^{-1} \left( l K^{-1} \begin{bmatrix} x \\ y \\ 1 \end{bmatrix} - t_C \right) + d = 0$$

and $$l [a \; b \; c] R_C^{-1} K^{-1} \begin{bmatrix} x \\ y \\ 1 \end{bmatrix} = [a \; b \; c] R_C^{-1} t_C - d.$$

Assuming that the ground lies on the Z=0 plane, then d=0, the normal vector of the ground plane $[a \; b \; c]^T = [0 \; 0 \; 1]^T$ and all variables in the equation above are known. Therefore, a value for l may be computed for each coordinate of the key point, and the mobile-agent coordinates may be computed using the computed l value.

Referring again to FIG. 1, a motion estimate may be computed 112 using the world coordinates of the key points for the feature-correspondence pairs. The motion estimate may comprise an optimal, rigid transformation, which may be denoted $T_{k,k-1}$, that may align the three-dimensional coordinates of each key point associated with a feature-correspondence point in the previous frame with the three-dimensional coordinates of its corresponding key point in the current frame.

Denoting the set of three-dimensional coordinates of the key points associated with a feature-correspondence point in the previous frame as A and the set of three-dimensional coordinates of the corresponding key points in the current frame as B, the relation between A and B may be written:

$$B = T_{k,k-1} A,$$

where $T_{k,k-1}$ may denote the transformation between the current and the previous frame. Since the camera motion is rigid motion, the transformation, $T_{k,k-1}$, may consist of a rigid rotation between the previous time and the current time, which may be denoted $R_{k,k-1}$, and a translation between the previous time and the current time, which may be denoted $t_{k,k-1}$. Therefore, $$B = T_{k,k-1} A = \begin{bmatrix} R_{k,k-1} & t_{k,k-1} \\ 0 & 1 \end{bmatrix} A = R_{k,k-1} A + t_{k,k-1}.$$

Figure 3:
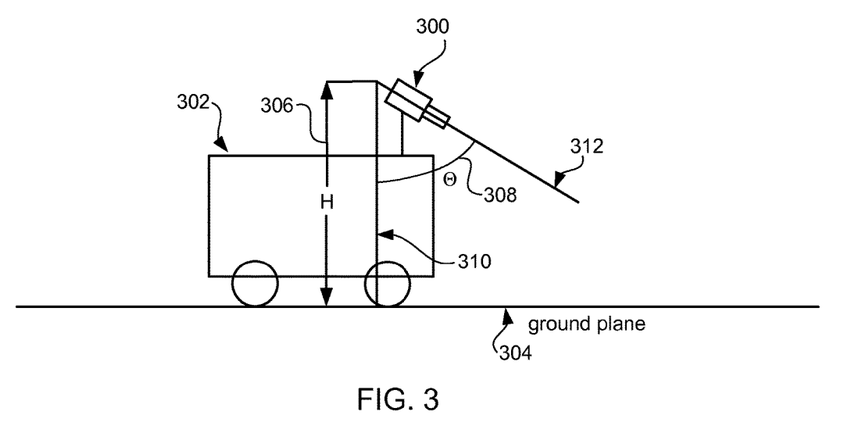
FIG. 3 is a picture illustrating an exemplary camera configuration on a mobile-agent platform according to exemplary embodiments of the present invention.

In some embodiments of the present invention, a camera configuration on a mobile-agent platform may be described in relation to FIG. 3. A precisely calibrated camera 300 may be rigidly mounted with respect to a mobile agent 302 and a ground plane 304. In some embodiments of the present invention, the camera 300 may be mounted on the front of the mobile agent 302 above the body chassis. The camera 300 may be tilted toward the ground to provide a good view of the ground directly in front of the mobile agent 302. In alternative embodiments of the present invention (not shown), the camera may be mounted on the back end of the mobile agent above the body chassis. The camera may be tilted toward the ground to provide a good view of the ground directly behind the mobile agent.

The height 306, which may be denoted H, above the ground plane 304 and the angle 308, which may be denoted Θ, between the normal 310 to the ground plane 304 and the camera 300 line-of-sight 312 may be assumed to be constant. Additionally, it may be assumed that the angle, Θ, 308 may not be subject to large vibrations as the mobile agent 302 moves across the ground. The extrinsic camera parameters with respect to the ground characterize the values H and Θ and the rotation and translation of the camera coordinate frame from the mobile-agent coordinate frame.

Further assuming that the mobile-agent 302 travels over a predominantly planar ground plane 304, the assumption that a fixed camera-to-ground relationship holds at each time instant during mobile-agent travel remains valid.

The above-described assumptions allow the simplification of the parameterization of the motion of the mobile agent at any time instant from six degrees of freedom to three degrees of freedom: a translation in x and y, which may be denoted $[x_{k,k-1}, y_{k,k-1}]$, and a rotation, which may be denoted $\theta_{k,k-1}$, all with respect to the global world coordinate frame. Thus, with inter-frame transformation, $T_{k,k-1}$, may be written:

$$T_{k,k-1} = \begin{bmatrix} R_{k,k-1} & t_{k,k-1} \\ 0 & 1 \end{bmatrix}$$

$$= \begin{bmatrix} \cos(-\theta_{k,k-1}) & -\sin(-\theta_{k,k-1}) & -x_{k,k-1} \\ \sin(-\theta_{k,k-1}) & \cos(-\theta_{k,k-1}) & -y_{k,k-1} \\ 0 & 0 & 1 \end{bmatrix}.$$

Figure 4:
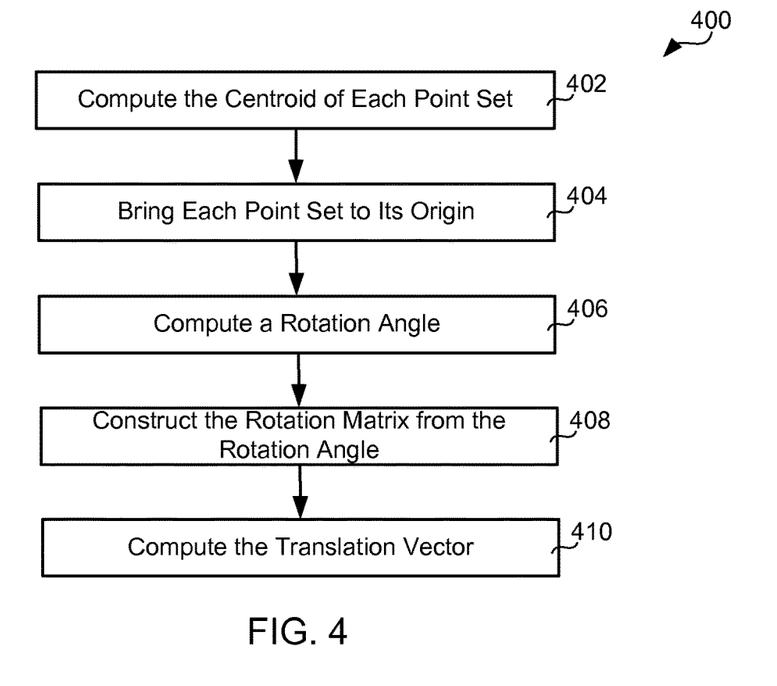
FIG. 4 is a chart showing exemplary embodiments of the present invention comprising Absolute-Orientation-based (AO-based) motion estimation.

Some embodiments comprising an Absolute-Orientation-based method 400 for estimation of the rigid rotation, $R_{k,k-1}$, and the translation, $t_{k,k-1}$, may be described in relation to FIG. 4. In these exemplary embodiments, the rigid rotation, $R_{k,k-1}$, and the translation, $t_{k,k-1}$, may be estimated by minimizing the mean-squared-error (MSE), which may be denoted E, between the centralized points corresponding to the paired points in A and B according to:

$$E = \frac{1}{n}\sum_{i=1:n} \|B'_i - R_{k,k-1}A'_i - t_{k,k-1}\|,$$

where n may denote the number of feature correspondence pairs, and $A_i'$ and $B_i'$ may denote the centralized points computed according to:

$$\overline{B} = \frac{1}{n}\sum_{i=1:n} B_i$$

$$\overline{A} = \frac{1}{n}\sum_{i=1:n} A_i$$

$$B'_i = B_i - \overline{B}$$

$$A'_i = A_i - \overline{A}.$$

In these exemplary embodiments, a centroid may be computed 402 for each point set A and B according to:

$$\overline{A} = \frac{1}{n}\sum_{i=1:n} A_i$$

$$\overline{B} = \frac{1}{n}\sum_{i=1:n} B_i,$$

respectively. Each point set may be brought 404 to its origin according to:

$$A_i' = A_i - \overline{A}, B_i' = B_i - \overline{B}.$$

A rotation angle, $\theta_{k,k-1}$, may be computed 406 according to:

$$\sin\theta_{k,k-1} = \pm\frac{S}{\sqrt{S^2 + C^2}}$$

and $$\cos\theta_{k,k-1} = \pm\frac{C}{\sqrt{S^2 + C^2}},$$

where $$C = \sum_{i=1:n} A'_i \cdot B'_i$$

and $$S = \left(\sum_{i=1:n} A'_i \times B'_i\right) \cdot \hat{n},$$

where • may denote the dot product, × may denote the cross product and n may denote the normal to the plane in which the rotation lies.

The rotation matrix, $R_{k,k-1}$, may be constructed 408 using the rotation angle, $\Theta_{k,k-1}$, according to:

$$R_{k,k-1} = \begin{bmatrix} \cos\theta_{k,k-1} & -\sin\theta_{k,k-1} & 0 \\ \sin\theta_{k,k-1} & \cos\theta_{k,k-1} & 0 \\ 0 & 0 & 1 \end{bmatrix}.$$

The translation, $t_{k,k-1}$, may be computed 410 according to:

$$t_{k,k-1} = \overline{B} - R_{k,k-1}\overline{A}.$$

Figure 5:
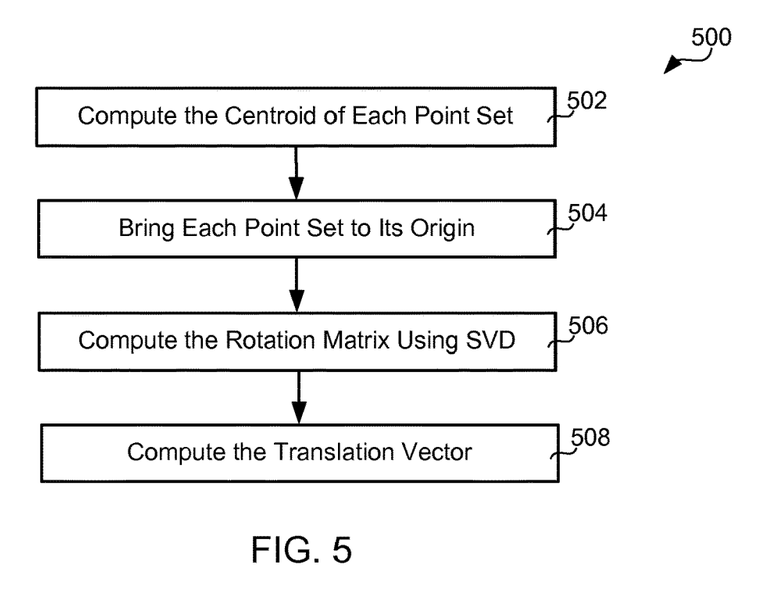
FIG. 5 is a chart showing exemplary embodiments of the present invention comprising Orthogonal-Procrustes-Analysis-based motion estimation.

Alternative embodiments comprising an Orthogonal-Procrustes-Analysis-based method 500 for estimation of the rigid rotation, $R_{k,k-1}$, and the translation, $t_{k,k-1}$, may be described in relation to FIG. 5.

In these exemplary embodiments, a centroid may be computed 502 for each point set A and B according to:

$$\overline{A} = \frac{1}{n}\sum_{i=1:n} A_i$$

$$\overline{B} = \frac{1}{n}\sum_{i=1:n} B_i,$$

respectively. Each point set may be brought 504 to its origin according to:

$$A_i'=A_i-\overline{A}, B_i'=B_i-\overline{B}.$$

The rotation matrix may be computed 506 using singular value decomposition (SVD). First the covariance matrix, which may be denoted H, may be computed according to:

$$H = \sum_{i=1:n} B_i'(A_i')^T.$$

The singular value decomposition of the covariance matrix, H, may be computed, wherein $SVD(H)=U\Sigma V^T$. The rotation matrix, $R_{k,k-1}$, may be computed according to:

$$R_{k,k-1} = V\begin{pmatrix} 1 & 0 & 0 \\ 0 & 1 & 0 \\ 0 & 0 & d \end{pmatrix} U^T,$$

where $$d=\text{sign}(\det(VU^T))$$

and ensures a right-handed coordinate system.

The translation, $t_{k,k-1}$, may be computed 508 according to:

$$t_{k,k-1}=\overline{B}-R_{k,k-1}\overline{A}.$$

In some embodiments of the present invention, motion estimation 112 may comprise outlier rejection to remove outliers caused by, for example, image noise, occlusions, blur, changes in viewpoint, changes in illumination and other causes for which the mathematical model of the feature detector does not account. In some embodiments of the present invention, a RANdom Sample Consensus (RANSAC) iterative motion estimation may be performed. RANSAC computes model hypotheses from randomly sampled sets of data points and then verifies these hypotheses on the other data points. The hypothesis that shows the highest consensus with the other data is selected as the solution. In these embodiments, the estimated model is the relative motion, $R_{k,k-1}$ and $t_{k,k-1}$, between the two camera positions, and the data points are the candidate feature correspondences. In some embodiments of the present invention, motion estimation may be performed according to the following pseudo code:

```
Algorithm: RANSAC motion estimation
Input: 3D feature correspondences (originSet, destinationSet)
bestError, bestInliers ←NULL
for iteration=1:N do
    samples←randomly pick up k pairs from (originSet, destinationSet)
    compute R and t from samples
    projectedSet←projectPoints(originSet, destinationSet)
    [meanError, inliers] ←constructInliersSet(projectedSet, destinationSet)
    if meanError > T₁ ∥ NumInliers < T₂ ∥ & inliersRatio < T₃
        continue;
    end if
    if meanError < bestError
        bestError = meanError
        bestInliers = inliers
    end if
end for
if size of bestInliers > 0
    recompute R and t from bestInliers set
    validTransform = true
```

-continued

```
    else
        validTransform = false;
    end if
End Algorithm
``` where, in some embodiments, N, the number of iterations is set to 50, k, the number of pairs to sample is set to 3, the error threshold, $T_1$, is in the range of 3-5 mm, the number of inliers threshold is $T_2=5$ and the threshold for the ratio of the inliers is $T_3=0.55$.

Drift may become severe with error accumulation. In order to reduce drift, some embodiments of the present invention may not determine a camera pose corresponding to each motion estimate due to an increasing accumulation of error with increased concatenation of motion estimates. Therefore, referring again to FIG. 1, a determination may be made 118 whether or not the currently calculated motion estimate should be used to estimate the camera pose, thereby identifying a key pose. In some embodiments of the present invention, a current camera pose may be considered a key pose if the rotation angle, $\theta_{k,k-1}$, of the current motion estimate meets a first condition relative to an angle threshold or if the distance traveled meets a second condition relative to a distance threshold. In some embodiments, the current camera pose may be considered a key pose when the rotation angle, $\theta_{k,k-1}$, is larger than the angle threshold or the distance traveled is larger than the distance threshold. The distance traveled may be computed according to $\|t_{k,k-1}\|^2$.

If the current camera pose is not 120 determined to be a key pose, then the method 100 may continue by waiting to receive 102 the next incoming image.

If the current camera pose is 122 determined to be a key pose, then the current camera pose may be generated according to:

$$C_k=C_{k-1}T_{k,k-1},$$

where $C_{k-1}$ denotes the camera pose at time k−1. In some embodiments of the present invention, the initial camera pose may be set to the identity matrix. The current camera pose comprises the concatenation of all of the transformations, $T_{k,k-1}$ (k=1, ..., n), where n is the current time instant. The current camera pose, $C_k$, has the form $$C_k = \begin{bmatrix} \cos\theta_k & -\sin\theta_k & x_k \\ \sin\theta_k & \cos\theta_k & y_k \\ 0 & 0 & 1 \end{bmatrix},$$

and the motion parameters $[x_k, y_k, \theta_k]$ may be determined 128 from the key pose and stored. The descriptor set from the current frame may update 130 the descriptor set from the previous frame. The method 100 may continue by waiting to receive 102 the next incoming frame.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A visual odometry method for estimating vehicle motion, said method comprising:
   providing a vehicle equipped with a camera rigidly mounted and calibrated with respect to the vehicle;
   moving the vehicle from a starting position in a global coordinate frame to a first location across a planar ground plane;
   receiving an incoming image on the camera;
   performing feature detection on said incoming image to identify a plurality of regions, wherein each region in said plurality of regions is associated with a key point in an incoming image coordinate frame;
   selecting a feature descriptor for each region in said plurality of regions, thereby producing a plurality of feature descriptors for said incoming image coordinate frame;
   performing feature matching between said plurality of feature descriptors for said incoming image coordinate frame and a plurality of feature descriptors selected for a previous image coordinate frame, thereby producing a plurality of feature correspondences;
   for each feature correspondence in said plurality of feature correspondences, aligning key points from said previous image coordinate frame to said incoming image coordination frame;
   projecting said key points to a previous world coordinate frame and an incoming world coordinate frame at the planar ground plane, thereby producing a plurality of pairs of world coordinates at the planar ground plane;
   estimating vehicle motion from said plurality of pairs of world coordinates at the planar ground plane;
   minimizing an accumulation of errors by selecting a key pose as follows:
      comparing a rotation angle of said motion estimate to an angle threshold and a distance traveled by the vehicle to a distance threshold; and
      when said angle comparison meets a first criterion or said distance comparison meets a second criterion;
   projecting said key pose to a current camera pose in said global coordinate frame;
   determining a motion trajectory from said current camera pose; and
   updating said plurality of feature descriptors selected for a previous world coordinate frame to said plurality of feature descriptors for said incoming world coordinate frame, wherein
   said motion estimate comprises a rotation matrix and a translation vector;
   said rotation matrix is associated with no more than three degrees of freedom and an in-plane rotation that is in-plane with respect to the ground plane;
   said motion estimate comprises a rigid transformation $T_{k,k-1}$
   where said rigid transformation $T_{k,k-1}$ consists of the rotation matrix $R_{k,k-1}$ between a previous time (k−1) and a current time (k), and the translation vector $t_{k-k-1}$ between the previous time and the current time, such that $$T_{k,k-1} = \begin{bmatrix} R_{k,k-1} & t_{k,k-1} \\ 0 & 1 \end{bmatrix}.$$

2. The method as described in claim 1, wherein said performing feature detection comprises using a feature detector selected from the group consisting of an edge detector, a corner detector, a blob detector, a peak detector, a SIFT key-point detector, a SURF key-point detector, a FAST key-point detector, a grid-based FAST key-point detector, an ORB key-point detector, a MSER key-point detector, a BRIEF key-point detector, a BRISK key-point detector, a FREAK key-point detector and a STAR key-point detector.

3. The method as described in claim 1, wherein said feature descriptor is a feature descriptor selected from the group consisting of a block of pixel values, a block of normalized pixel values, a block of gradient values, a block of adjusted pixel values, a SIFT feature descriptor, a SURF feature descriptor, an ORGB feature descriptor, a BRIEF feature descriptor, a BRISK feature descriptor and a FREAK feature descriptor.

4. The method as described in claim 1, wherein said performing feature matching comprises a fast, nearest-neighbor search with a k-dimensional tree.

5. The method as described in claim 1, wherein said performing feature matching comprises pruning a plurality of candidate matches.

6. The method as described in claim 1, wherein said computing the motion estimate comprises using a motion estimator selected from the group consisting of an Orthogonal-Procrustes-Analysis-based motion estimator and an Absolute-Orientation-based motion estimator.

7. The method as described in claim 1, wherein performing feature detection comprises performing feature detection using a first mathematical model; and,
   wherein estimating vehicle motion comprises rejecting outliers not accounted for in said first mathematical model.

8. The method as described in claim 7, wherein said rejecting outliers comprises performing RANSAC motion estimation.

9. The method as described in claim 1, wherein:
   said first criterion is said rotation angle is greater than said angle threshold; and
   said second criterion is said distance traveled is greater than said distance threshold.

10. The method as described in claim 1, wherein said generating a current camera pose comprises concatenating said estimated motion to a previous camera pose.

11. The method of claim 1 wherein estimating said motion using said rigid transformation $T_{k,k-1}$ comprises minimizing the mean-squared-error (MSE), denoted as E, as follows:

$$E = \frac{1}{n} \sum_{i=1:n} \|B'_i - R_{k,k-1} A'_i - t_{k,k-1}\|,$$

where n may denote the number of feature correspondence pairs, and $A_i'$ and $B_i'$ may denote the centralized points computed according to:

$$\overline{B} = \frac{1}{n}\sum_{i=1:n} B_i \quad \overline{A} = \frac{1}{n}\sum_{i=1:n} A_i$$
$$B_i' = B_i - \overline{B} \quad A_i' = A_i - \overline{A}$$

12. The method of claim 1 wherein minimizing the accumulation of errors comprises decreasing the accumulation of errors in response to an action selected from the group consisting of increasing the angle threshold or increasing the distance threshold.

13. A vehicle odometry system comprising:
a vehicle in motion from a starting position in a global coordinate frame to a first location;
a camera rigidly mounted and calibrated with respect to the vehicle;
a processor component; and
a non-transitory computer-readable medium encoded with a computer program code for causing said processor component to execute a method for estimating vehicle motion, said method comprising:
receiving an incoming image;
performing feature detection on said incoming image to identify a plurality of regions, wherein each region in said plurality of regions is associated with a key point in an incoming image coordinate frame;
selecting a feature descriptor for each region in said plurality of regions, thereby producing a plurality of feature descriptors for said incoming image coordinate frame;
performing feature matching between said plurality of feature descriptors for said incoming image coordinate frame and a plurality of feature descriptors selected for a previous image coordinate frame, thereby producing a plurality of feature correspondences;
for each feature correspondence in said plurality of feature correspondences, aligning key points from said previous image coordinate frames to said incoming image coordinate frame;
projecting said keys points to a previous world coordinate frame and an incoming world coordinate frame at the planar ground plane, thereby producing a plurality of pairs of world coordinates at the planar ground plane;
estimating vehicle motion from said plurality of pairs of world coordinates at the planar ground plane;
minimizing an accumulation of errors by selecting a key pose as follows:
comparing a rotation angle of said motion estimate to an angle threshold and a distance traveled by the vehicle to a distance threshold; and
when said angle comparison meets a first criterion or said distance comparison meets a second criterion;
projecting said key pose to a current camera pose in said global coordinate frame;
determining a motion trajectory from said current camera pose;
updating said plurality of feature descriptors computed for a previous world coordinate frame to said plurality of feature descriptors for said incoming world coordinate frame, wherein said motion estimate comprising a rotation matrix and a translation vector, said rotation matrix being associated with no more than three degrees of freedom and an in-plane rotation that is in-plane with respect to the ground plane;
said motion estimate comprises a rigid transformation $T_{k,k-1}$; and
said rigid transformation $T_{k,k-1}$ consists of the rotation matrix $R_{k,k-1}$ between a previous time and a current time, and the translation vector $t_{k-k-1}$ between the previous time and the current time, such that $$T_{k,k-1} = \begin{bmatrix} R_{k,k-1} & t_{k,k-1} \\ 0 & 1 \end{bmatrix}.$$

14. The system as described in claim 13, wherein:
said camera is mounted on a front end or a back end of said vehicle and above a body chassis of said vehicle; and
when said camera is mounted on said front end of said vehicle, said camera is tilted to have a field of view of a ground path directly in front of said vehicle and when said camera is mounted on said back end of said vehicle, said camera is tilted to have a field of view of said ground path directly behind said vehicle.

15. A non-transitory computer-readable medium encoded with a computer program code for causing a processor to execute a visual odometry method for estimating vehicle motion, said code comprising the steps of:
receiving an incoming image from a camera rigidly mounted and calibrated with respect to a vehicle in motion from a starting position in a global coordinate frame to a first location;
performing feature detection on said received, incoming image to identify a plurality of regions, wherein each region in said plurality of regions is associated with a key point in an incoming image coordinate frame;
selecting a feature descriptor for each region in said plurality of regions, thereby producing a plurality of feature descriptors for said incoming image coordination frame;
performing feature matching between said plurality of feature descriptors for said incoming image and a plurality of feature descriptors computed for a previous image coordination frame, thereby producing a plurality of feature correspondences;
for each feature correspondence in said plurality of feature correspondences, aligning key points from said previous image coordinate frames to said incoming image coordination frame;
projecting said key points to a previous world coordinate frame and an incoming world coordinate frame at the planar ground plane, thereby producing a plurality of pairs of world coordinates at the planar ground plane;
estimating vehicle motion from said plurality of pairs of world coordinates at the planar ground plane;
minimizing an accumulation of errors by selecting a key pose as follows:
comparing a rotation angle of said motion estimate to an angle threshold and a distance traveled by the vehicle to a distance threshold; and
when said angle comparison meets a first criterion or said distance comparison meets a second criterion;
projecting said key pose to a current camera pose in said global coordinate frame;

determining a motion trajectory from said current camera pose;
updating said plurality of feature descriptors computed for a previous world coordinate frame to said plurality of feature descriptors for said incoming world coordinate frame, wherein
said motion estimate comprising a rotation matrix and a translation vector, said rotation matrix being associated with no more than three degrees of freedom and an in-plane rotation that is in-plane with respect to the ground plane;
said motion estimate comprises a rigid transformation $T_{k,k-1}$; and
said rigid transformation $T_{k,k-1}$ consists of the rotation matrix $R_{k,k-1}$ between a previous time and a current time, and the translation vector $t_{k-k-1}$ between the previous time and the current time, such that $$T_{k,k-1} = \begin{bmatrix} R_{k,k-1} & t_{k,k-1} \\ 0 & 1 \end{bmatrix}.$$

16. The non-transitory computer-readable medium as described in claim 15, wherein said processor is integrated on said vehicle.

* * * * *

UNITED STATES PATENT AND TRADEMARK OFFICE
CERTIFICATE OF CORRECTION

PATENT NO. : 10,339,389 B2
APPLICATION NO. : 14/476524
DATED : July 2, 2019
INVENTOR(S) : Xinyu Xu, Miao Liao and Petrus J. L. van Beek

It is certified that error appears in the above-identified patent and that said Letters Patent is hereby corrected as shown below:

In the Specification

The formula at Column 10, Line 10, should be printed as follows:
$$A'_i = A_i - \overline{A} \quad B'_i = B_i - \overline{B}.$$

The formula at Column 11, Line 3, should be printed as follows:
$$A'_i = A_i - \overline{A} \quad B'_i = B_i - \overline{B}.$$

Signed and Sealed this
Twenty-first Day of April, 2020

Andrei Iancu
*Director of the United States Patent and Trademark Office*